Aug. 7, 1956 C. LISCIANI 2,758,018
HAZARDOUS FLUID PIPE COUPLING
Filed April 7, 1951
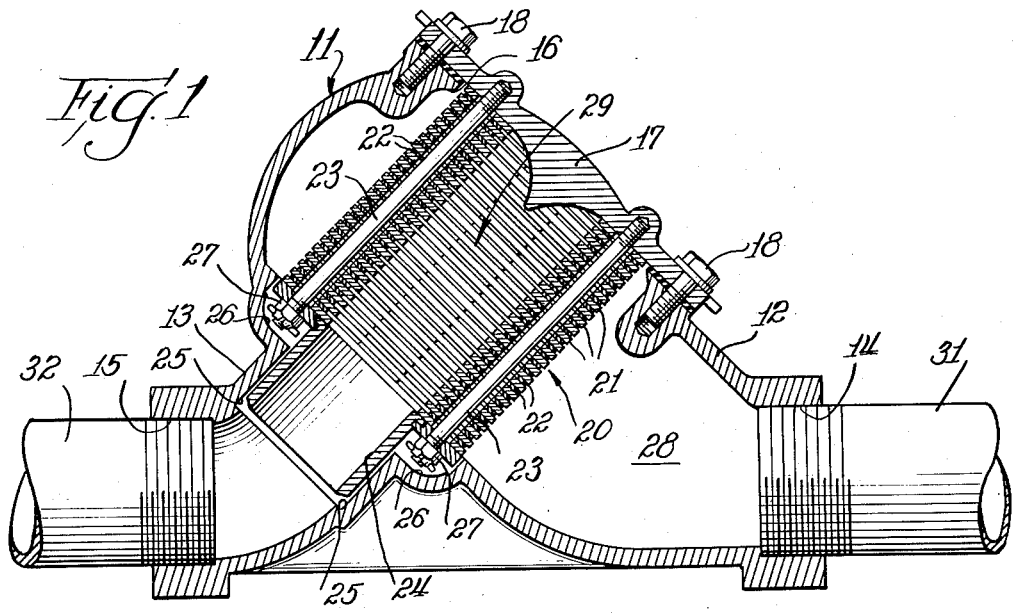
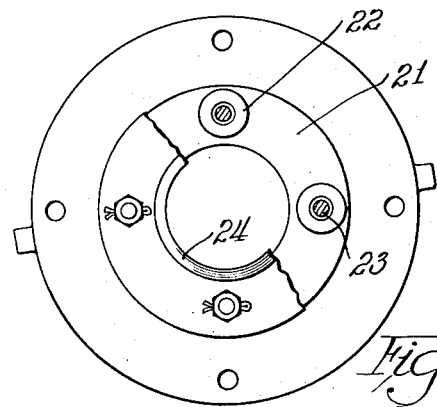
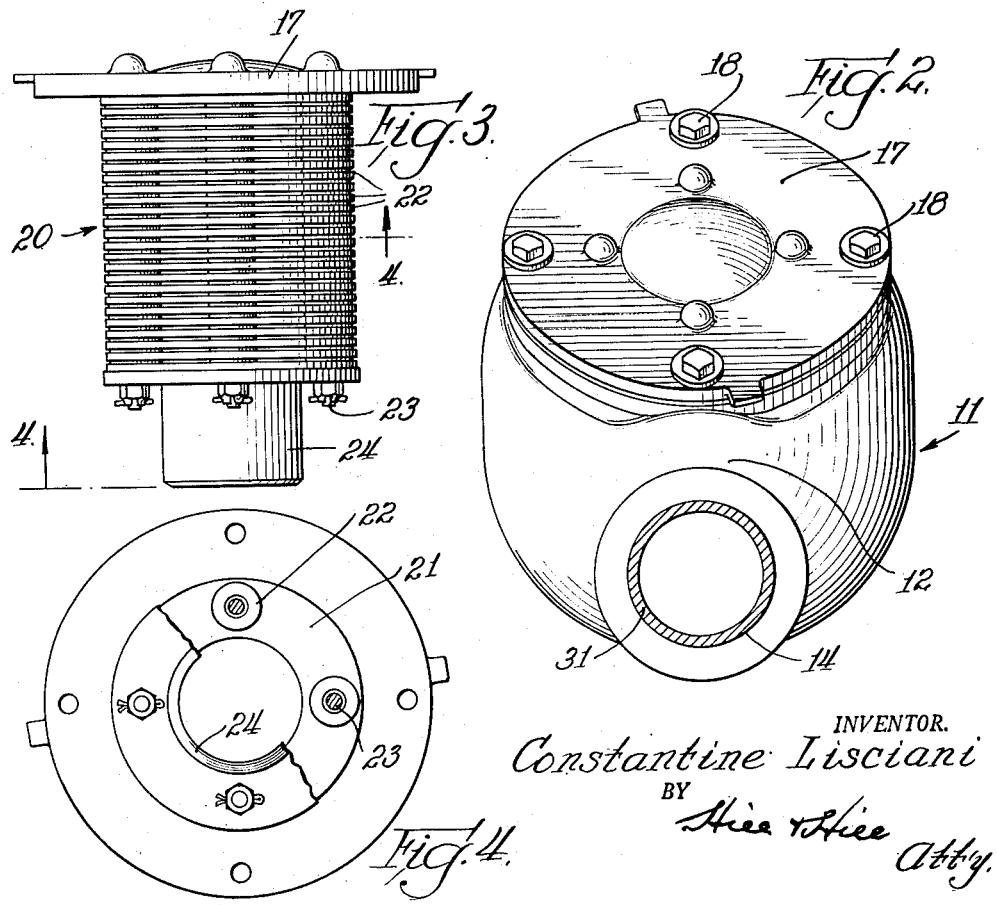
INVENTOR.
Constantine Lisciani
BY United States Patent Office 2,758,018
Patented Aug. 7, 1956

2,758,018

HAZARDOUS FLUID PIPE COUPLING

Constantine Lisciani, Chicago, Ill., assignor to The Protectoseal Company, Chicago, Ill., a corporation of Illinois Application April 7, 1951, Serial No. 219,811

5 Claims. (Cl. 48—192)

The present invention relates to a pipe coupling.

More particularly, the invention relates to a pipe coupling of the type that includes a flame arrester element, and that is used in pipe lines or mains for conveying hazardous fluids.

While pipe couplings having flame arrester elements disposed therein are known in the art, such couplings have certain undesirable features which inherently restrict their use, as well as the utility of the pipe lines or mains in which they are incorporated. These undesirable features arise due to the fact that any one particular hazardous fluid, whether it be a vapor or a liquid, requires a flame arrester element which is especially designed for use with that specific hazardous fluid. With known pipe couplings which include flame arrester elements, protected pipe lines or mains can accommodate only one particular variety of hazardous fluid, and this fact greatly restricts the utility of such pipe lines or mains. In order to change the pipe line over for use with different varieties of hazardous fluids, it is necessary to break the pipe line down completely, replace the old flame arrester elements with new flame arresters, and then reassemble the pipe line. Such an operation is obviously expensive and wasteful. Additionally, with known couplings the maintenance and renewal of flame arrester elements likewise requires complete breakdown and reassembly of the pipe system, and therefore is unduly expensive.

It is therefore one object of the present invention to provide a novel pipe coupling having a flame arrester element therein which is so designed that the flame arrester element can be readily changed in order to adapt the piping system in which the coupling is incorporated for use with different types of hazardous fluids.

Another object of the invention is to provide a novel pipe coupling having a flame arrester element therein which is so designed as to facilitate the maintenance and repair of the piping system in which the coupling is incorporated.

A feature of the invention is the provision of a pipe coupling having a removable flame arrester element disposed therein, which element can be readily removed for replacement or cleaning.

Other objects, features, and many of the attendant advantages of this invention will be appreciated readily as the same becomes understood by reference to the following detailed description, when considered in connection with the accompanying drawings, wherein:

Fig. 1 is a sectional view of a pipe coupling constructed in accordance with the invention;

Fig. 2 is an end elevational view of the coupling shown in Fig. 1;

Fig. 3 is a side elevational view of a flame arrester element comprising a part of the pipe coupling shown in Fig. 1; and Fig. 4 is a cross sectional view of the flame arrester element taken through plane 4—4 of Fig. 3.

Referring now to Fig. 1 of the drawings, the novel pipe coupling comprising the invention is shown. The pipe coupling includes a generally V-shaped hallow member, indicated at 11, comprising a pair of intersecting, tubular leg portions 12 and 13 having threaded openings 14 and 15 in the ends thereof. Member 11 is of cast construction, and may be made of aluminum, steel, or other suitable material, and has an opening 16 additional to threaded openings 14 and 15 formed in the exposed face thereof opposite leg portion 13. The opening 16 is closed by a removable cover member 17 secured to member 11 by means of a plurality of threaded studs 18.

Disposed within the interior of hollow member 11 is a flame arrester element or structure, indicated generally at 20, which is preferably secured to the under side of cover member 17. As is best shown in Figs. 1, 3, and 4, the flame arrester structure 20 comprises a plurality or stack of coaxially aligned, stacked annular discs 21 separated by a plurality of washers or spacers 22 which, if desired, can be embossed on the discs 21 during the manufacture thereof. The annular discs 21 are held in assembled relation by longitudinally extending posts or studs 23 threadably secured in cover member 17. Attached to the end of flame arrester element structure 20, opposite the end thereof secured to cover member 17, is a tubular extension 24 which is coaxial with the stacked annular discs 21 comprising the flame arrester structure, and which provides access to the inner area defined by annular discs 21.

In assembling the pipe coupling comprising the invention, the flame arrester structure 20 is secured to cover member 17 of the coupling by means of posts 23. The cover member is then attached over the opening 16 in hollow member 11 with the tubular extension 24 on the end of the flame arrester structure extending into and telescoped within the leg portion 13 of the hollow member. If desired, the interior of the leg portion 13 may be enlarged, as at 25, to receive the tubular extension 24, and may have a plurality of recesses 26 formed therein to accommodate the ends 27 of posts 23. The fit provided for tubular extension 24 within leg portion 13 is such that substantially little or no fluid at all will be allowed to pass between the tubular extension and the inside wall of the leg portion. Thus, fluid passing through the coupling is forced to travel through the flame arrester structure 20. The flame arrester structure 20 is so designed that the total cross sectional area provided by the spacing between each of the annular discs 20 comprising the structure is equal to, or preferably greater than the cross sectional area of the minimum diameter point of the piping system in which the coupling is used. By reason of this construction, the flame arrester structure will not impede the flow of fluid through the system.

As the operation or function of a flame arrester structure is well known in the art, a detailed description of that function is believed unnecessary. Broadly, the structure serves to extinguish any flame or fire which might occur within the piping system in which the structure is incorporated. This result is achieved due to the small spacing available between the adjacent annular discs of the flame arrester structure through which flame fronts might travel. As the flame front travels through the space between discs, its temperature is reduced below the temperature of combustion and it is extinguished. Thus, it can be seen that in the present invention the flame arrester structure 20 serves to divide the interior of hollow member 11 into a first isolated chamber 28 and a second isolated chamber 29, between which the transmission of flame fronts is prevented. First isolated chamber 28 directly communicates with the opening 14 in the leg portion 12 of the member to which one end of one of the pipes 31 to be coupled together may be threadably secured. And the remaining or second chamber 29 likewise directly communicates through tubular extension 24 with the opening 15 in the leg portion 13 of hollow member 11 to which the end of the second pipe 32 is threadedly secured.

By reason of the above construction, it can be readily appreciated that the novel coupling comprising the invention can be easily converted for use with many different types of hazardous fluids, thereby allowing the piping system in which the coupling is incorporated to be readily adapted to accommodate many different types of hazardous fluids. Conversion over from handling one type of hazardous fluid to another can be accomplished by simply removing the flame arrester element 20 and cover member 17 from the coupling and replacing the same with a new flame arrester element particularly designed for use with the new type of hazardous fluid to be handled. Additionally, since the flame arrester element 20 is subject to clogging, the feature of being readily removable greatly facilitates maintenance and repair of the piping system in which the coupling is incorporated due to the fact that the flame arrester element can be readily removed for cleaning or replacement.

Obviously many modifications and variations of the present invention are possible in the light of the above teachings. It is therefore to be understood that changes may be made therein which are within the full intended scope of the invention as defined by the appended claims.

What I claim as new and desire to secure by Letters Patent is:

1. A pipe coupling for hazardous fluid piping system, comprising a generally V-shaped hollow member having openings in the ends of the respective tubular leg portions thereof adapted to receive the adjacent ends of a pair of pipes of the hazardous fluid piping system to be coupled together in axial alignment, a cover member removably mounted and affixed to an exposed face of said coupling, said exposed face of said coupling opposite one of the leg portions thereof provided with an opening, a hollow foraminous flame arrester structure comprising a plurality of annular disks and a tubular extension secured to said cover member and supported within said hollow member at an inner opening of one of said leg portions opposite the cover member, the opening on said exposed face of the coupling complementally formed to detachably receive the flame arrester, the tubular extension complementally formed to the inner opening of the hollow member opposite the cover member and secured to the flame arrester structure at the end opposite the cover member, said hollow foraminous flame arrester structure dividing the interior of said hollow member into two interconnected chambers operatively connected together through said hollow foraminous flame arrester and preventing the transmission of flame fronts therebetween, said interconnected chambers divided by the hollow foraminous flame arrester into an isolated chamber exteriorly of the flame arrester and an isolated chamber within the flame arrester, each of said chambers directly communicating with a respective one of the openings in the ends of the leg portions of said V-shaped hollow member, the assembly of annular disks of the hollow foraminous flame being of a length to span the space between the cover member on one end and the tubular extension on the other end, and said spacing of the annular disks of the flame arrester providing a total cross-sectional area at least substantially equal to the cross-sectional area of the minimum diameter of the piping system to which the coupling is mounted, whereby the flow of fluid through the piping system is unimpaired.

2. A pipe coupling comprising a hollow body including two tubular angularly disposed fluid-conducting legs intersecting in generally V-shaped arrangement, a cover member removably secured on said body in substantial axial alignment with one of said legs, and a hollow foraminous flame arrester structure carried by said cover and supported thereby within said body, said flame arrester structure comprising a stack of relatively spaced annular disks and including a tubular element extending from said stacks at the end opposite the cover, said tubular element projecting into said one leg, whereby said flame arrester structure serves to divide the interior of said body into two interconnected chambers communicating respectively with said legs, the stack of annular disks of said flame arrester structure being axially of a length sufficient to isolate one of said legs from the other within said body to thereby provide for communication between said legs only through said flame arrester structure.

3. A pipe coupling as claimed in claim 2, wherein the assembly of disks is supported on studs extending between the tubular element and the cover.

4. A pipe coupling as claimed in claim 3, wherein the disks are spaced by washers interposed between the disks on the studs.

5. A pipe coupling as claimed in claim 3, wherein the tubular element has an annular offstanding flange which together with the cover provides end bearings for confining the stack of disks.

References Cited in the file of this patent

UNITED STATES PATENTS

| | | |
|---|---|---|
| 1,311,774 | Ritter | July 29, 1919 |
| 1,317,931 | Merrill | Oct. 7, 1919 |
| 1,735,261 | Calhoun | Nov. 12, 1929 |
| 2,162,043 | Westlund | June 13, 1939 |
| 2,287,162 | Bliss | June 23, 1942 |
| 2,618,539 | Conta et al. | Nov. 18, 1952 |
| 2,639,705 | Lebus | May 26, 1953 |

FOREIGN PATENTS

| | | |
|---|---|---|
| 123,953 | Austria | July 25, 1931 |
| 389,324 | Great Britain | Mar. 16, 1933 |